United States Patent [19]

Nelson

[11] Patent Number: 5,031,297
[45] Date of Patent: Jul. 16, 1991

[54] APPARATUS FOR SUPPORTING AN AIR ACTUATED PLATE CYLINDER

[75] Inventor: Robert R. Nelson, Green Bay, Wis.

[73] Assignee: Technology Machine, Inc., Green Bay, Wis.

[21] Appl. No.: 520,047

[22] Filed: May 7, 1990

[51] Int. Cl.$^5$ ............................................. B23P 11/02
[52] U.S. Cl. ...................................... 29/446; 29/234; 29/281.4; 29/281.5; 29/450; 29/464; 29/895.212
[58] Field of Search .............. 29/234, 255, 252, 281.4, 29/281.5, 446, 428, 450, 464, 421.1, 895.212; 101/218, 375

[56] References Cited

U.S. PATENT DOCUMENTS

| | | | |
|---|---|---|---|
| 2,518,834 | 8/1950 | Streckfus et al. | 29/234 |
| 3,061,914 | 11/1962 | Johnston | 29/234 |
| 3,241,221 | 3/1966 | Kelzenberg | 29/234 |
| 3,806,021 | 4/1974 | Moroz et al. | 29/281.4 |
| 3,846,901 | 11/1974 | Lovett | 29/234 |
| 4,126,927 | 11/1978 | Woodward et al. | 29/234 |
| 4,144,812 | 3/1979 | Julian | 29/446 |
| 4,635,333 | 1/1987 | Finch | 29/446 |
| 4,823,693 | 4/1989 | Köbler | 29/446 |

FOREIGN PATENT DOCUMENTS 0574304 9/1977 U.S.S.R. ................................ 29/234

Primary Examiner—Irene Cuda
Attorney, Agent, or Firm—Godfrey & Kahn

[57] ABSTRACT

An apparatus for supporting an air actuated plate cylinder to facilitate installation or removal of a print sleeve includes a support frame supporting the first end of the plate cylinder, a gantry mounted on the support frame, first and second carriages mounted for selective movement along the gantry and including first and second air cylinders which are operable to move their respective rams along a predetermined path of travel, and a support member engageable with the second end of the plate cylinder and which is further engageable by one of the rams made integral with one of the carriages, and wherein the print sleeve to be installed or removed is telescopingly received on the support member and wherein the respective rams are selectively moved into and out of respective supporting relationship relative to the second end of the plate cylinder thereby facilitating the installation of the print sleeve.

16 Claims, 6 Drawing Sheets

APPARATUS FOR SUPPORTING AN AIR ACTUATED PLATE CYLINDER

BACKGROUND OF THE INVENTION

1. Field of the Invention

The present invention relates to an apparatus for supporting an air actuated plate cylinder, and more particularly to an apparatus operable to facilitate the installation or removal of a print sleeve which is utilized in connection therewith.

2. Description of the Prior Art

In the printing industry, assorted machinery has been designed, developed and manufactured with the idea in mind of eliminating as much manual labor as possible. As should be understood, printing practices, heretofore, have been highly labor intensive operations and therefore the direct costs of labor and equipment that are required to print selected products have usually been substantial. In this regard, a variety of devices and practices have been developed and employed over the years to reduce the direct costs of labor and equipment utilized in various printing processes.

For example, the printing industry has recently employed seamless nickel printing sleeves in combination with air actuated plate cylinders to facilitate printing operations. As should be understood, the seamless nickel printing sleeves are designed so as to be mounted, by employing a friction fit, on and about the related plate cylinder. Therefore, the tolerances, that is, the inside diameter of the individual print sleeves are closely complementary to the outside diameter of the plate cylinder thereby permitting the plate cylinder to be telescopingly received in mating receipt with the respective print sleeve.

While this operable combination of a seamless nickel print sleeve and a plate cylinder operates with a high degree of efficiency, problems are frequently encountered in employing same when the respective print sleeves are removed, or are otherwise installed. To effect installation of the print sleeve, an operator of a printing machine will physically remove the air actuated plate cylinder from the machine and thereafter couple it in fluid communication with a source of pressurized air. Upon pressurization, the pressurized air escapes through a plurality of apertures formed in the exterior peripheral surface of the plate cylinder and is captured between the plate cylinder and the print sleeve which is being installed. This trapped air expands the print sleeve and thereby provides a cushion of air upon which the print sleeve is carried. This action of the pressurized air upon the print sleeve facilitates the print sleeves removal from, or installation upon, the plate cylinder as operational conditions warrant. While the basic procedure, or method for installation and removal of a print sleeve appears to be relatively simple, problems are frequently encountered in removing or installing a print sleeve as the overall size of the plate cylinder increases. In the case of large plate cylinders, printing machines employing same may be out of production for hours as these same large plate cylinders are removed and the respective print sleeves are removed and new print sleeves are installed for subsequent printing operations.

Still another problem encountered with the prior art practices and devices which have been utilized heretofore to aid and assist in the removal or installation of the aforementioned print sleeves is the propensity for these devices and other mechanisms to exhibit a characteristic inability to cooperate with other devices borne on the printing machine or which are located in the same or in adjoining workstations. In this regard such devices and practices have typically been cumbersome to utilize or implement, or further have been difficult to adjust such that they may be rendered operable to accommodate print cylinders having various longitudinal dimensions.

Therefore, it has long been known that it would be desirable to have an apparatus for supporting an air actuated plate cylinder to facilitate the installation or removal of a print sleeve, and which could be employed in a wide variety of different environments, which could be manufactured and purchased at relatively moderate cost, which is both highly efficient in operation and capable of facilitating the rapid installation or removal of print sleeves in a manner not possible heretofore, and which reduces to an absolute minimum the assorted problems associated with the removal and installation of assorted print sleeves for use in the printing industry.

SUMMARY OF THE INVENTION

Therefore, it is an object of the present invention to provide an improved apparatus for supporting an air actuated plate cylinder for facilitating the installation or removal of a print sleeve.

Another object of the present invention is to provide such an apparatus which is operable to obtain the individual benefits to be derived from related prior art devices and practices while avoiding the detriments individually associated therewith.

Another object of the present invention is to provide such an apparatus which is operable to reduce to an absolute minimum the overall time and labor required to install or remove a print sleeve from an associated air actuated plate cylinder.

Another object of the present invention is to provide such an apparatus which is readily adjustable so as to accommodate air actuated plate cylinders which may have different longitudinal and diametral dimensions.

Another object of the present invention is to provide such an apparatus which is operable to support an air actuated plate cylinder for facilitating the installation or removal of a print sleeve dependably, safely, and efficiently, while reducing to an absolute minimum the possibility of malfunction.

Another object of the present invention is to provide such an apparatus which is of relatively moderate cost to purchase and maintain and which further is inexpensive to operate.

Another object of the present invention is to provide such an apparatus which is characterized by ease of employment, and simplicity of construction.

Further objects and advantages are to provide improved elements and arrangements thereof in an apparatus for the purposes described which is dependable, economical, durable and fully effective in accomplishing its intended purposes.

These and other objects and advantages are achieved in an apparatus for supporting an air actuated plate cylinder to facilitate the installation of a print sleeve, the plate cylinder having opposite first and second ends, the apparatus including a frame for supporting the first end of the plate cylinder; a first support means for releasably supporting the second end of the plate cylinder; a support member operable to engage the second end of the plate cylinder; and a second support means adapted to engage the support member, and wherein the print sleeve is telescopingly received on the support member, and wherein following engagement of support member, the first support means is disengaged from the plate cylinder thereby permitting the print sleeve to be installed on the print cylinder.

DESCRIPTION OF THE PREFERRED EMBODIMENT

First Form

Figure 1:
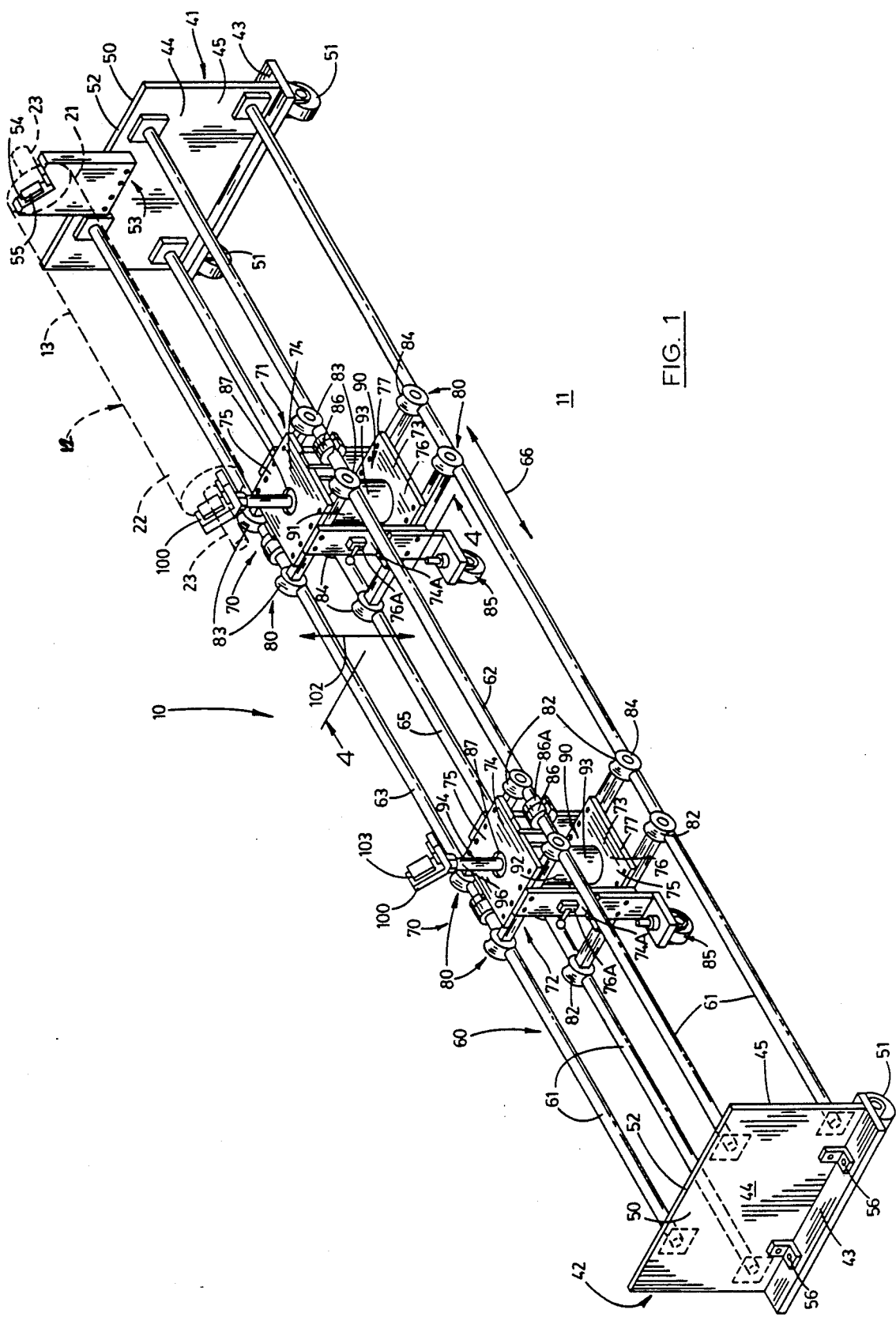
FIG. 1 is a perspective view of the first form of the apparatus of the subject invention shown in a typical operative configuration.

Referring more particularly to the drawings, the apparatus for supporting an air actuated plate cylinder for facilitating the installation or removal of a print sleeve of the present invention is generally indicated by the numeral 10 in FIG. 1. For illustrative convenience the apparatus as shown and described herein is discussed as it would be configured if it were employed to support individual air actuated plate cylinders which may have both random lengths and diametral dimensions.

Figures 3A, 3B:
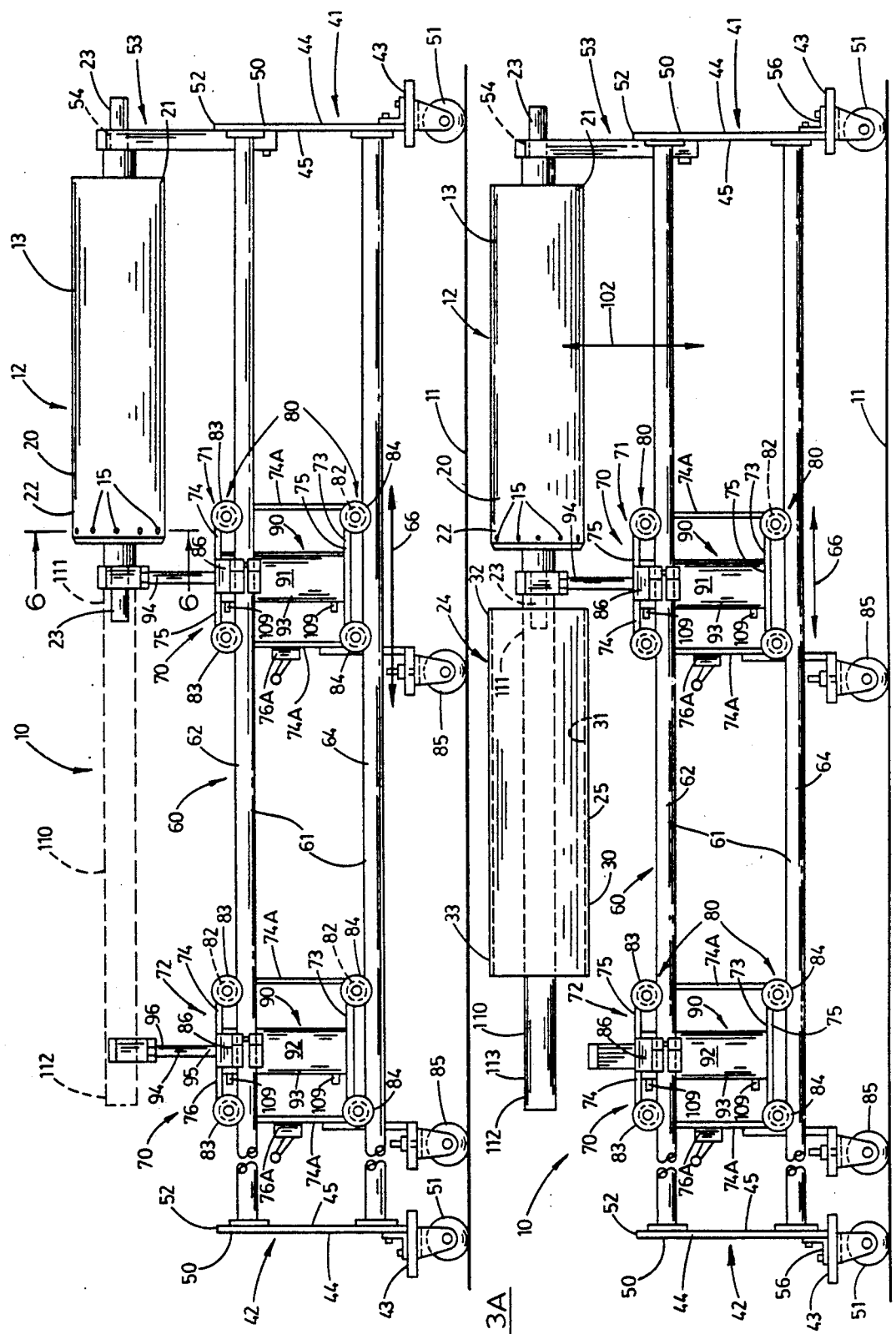
FIG. 3A is a first, fragmentary, side elevation view of the first form of the apparatus of the subject invention and showing an air actuated plate cylinder supported thereon to receive a print sleeve.
FIG. 3B is a second, fragmentary, side elevation view of the first form of the apparatus of the subject invention and showing a print sleeve positioned for installation on the accompanying air actuated plate cylinder.
Figures 3C, 3D:
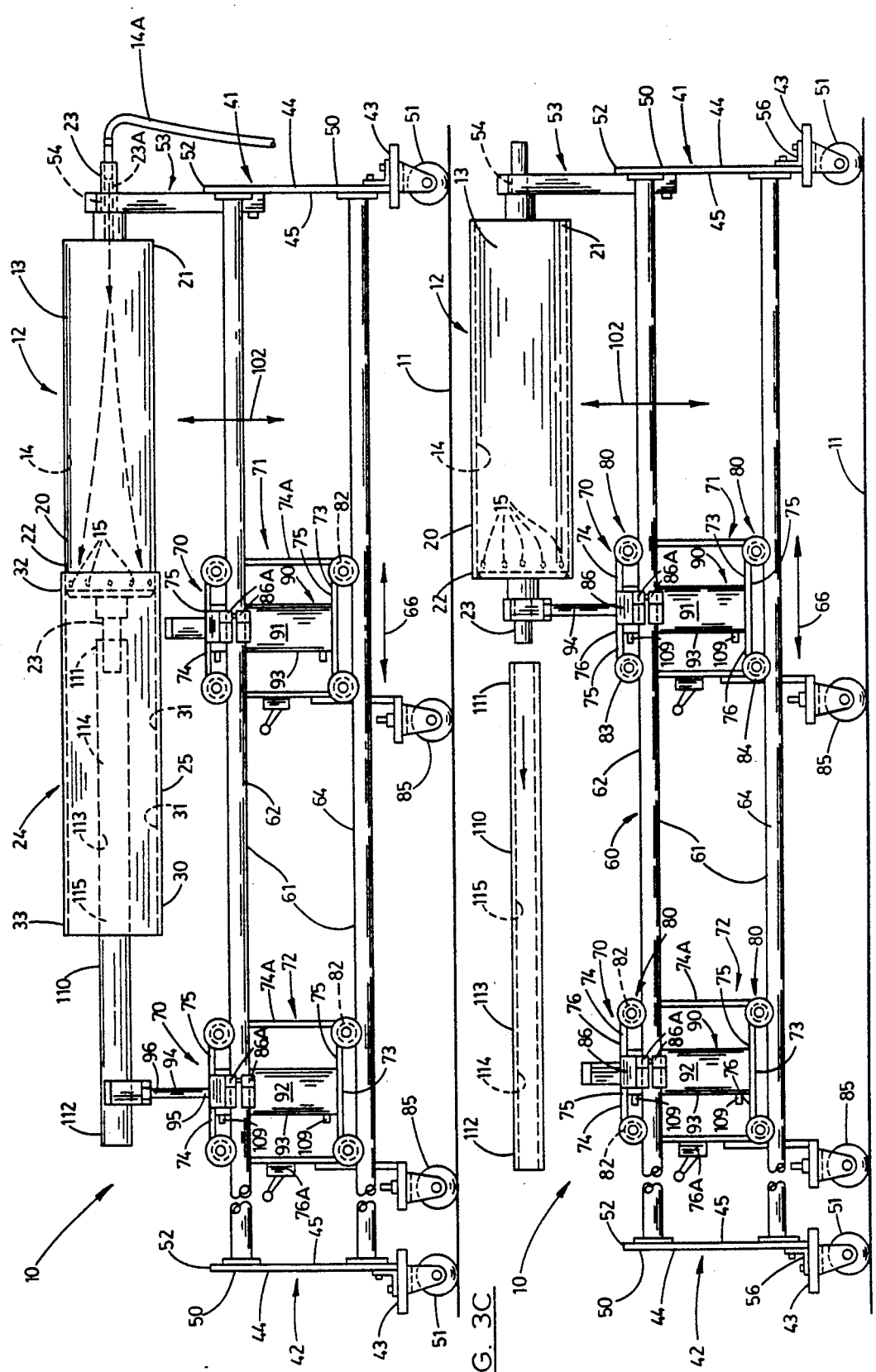
FIG. 3C is a third, fragmentary, side elevation view of the first form of the apparatus of the subject invention and showing a print sleeve being installed on the accompanying air actuated plate cylinder.
FIG. 3D is a fourth, fragmentary, side elevation view of the first form of the apparatus of the subject invention and showing the print sleeve installed on the air actuated plate cylinder.

The apparatus 10 of the subject invention is operable for movement along a supporting surface 11 such as a factory floor and the like, and further is operable to support an air actuated plate cylinder 12 which has a main body 13 which is elongated, and substantially cylindrical in its respective cross-sectional shape. The plate cylinder 12 further includes an internal cavity 14 which is operable to receive pressurized air from a source (not shown) through the detachable conduit 14A which is shown in FIG. 3C. The main body 13 of the plate cylinder includes a plurality of small air apertures 15 which are disposed in a predetermined pattern about one of its ends, and which connect the internal cavity 14 in fluid communication with the exterior surface 20 thereof. These small air apertures provide a means by which the pressurized air received in the cavity 14 may escape. As best seen by reference to FIG. 3A, the plate cylinder 12 has first and second ends 21 and 22 respectively. Further, and extending substantially longitudinally, outwardly, relative to the first and second ends respectively, are individual drive or supporting shafts 23. As best seen by reference to FIG. 3C the supporting shaft which is made integral with the first end of the plate cylinder provides a passageway 23A which permits pressurized air to be delivered to the cavity of the plate cylinder. As best seen by reference to FIGS. 3B and 3C, a seamless print sleeve 24, of substantially conventional design, is operable for installation on and about the plate cylinder 12 by utilizing a friction fit. The print sleeve 24 as discussed earlier, is seamless and slides over the underlying plate cylinder in substantially close fitting, telescoping relation. The installation of the print sleeve is accomplished when the print sleeve is expanded slightly by employing the air pressure which escapes from the apertures 15 which are made integral with the main body 13 of the plate cylinder, and which is subsequently trapped between the print sleeve and the main body of the plate cylinder. In this fashion, the print sleeve is rendered operable to slide onto the underlying plate cylinder on a cushion or layer of pressurized air. When the air pressure is released, the print sleeve contracts around the plate cylinder and is held in place by a friction fit as shown in FIG. 3D. The print sleeve includes a seamless nickel compound sleeve which is approximately 0.004 through 0.009 inches thick and which has an exterior coating which may include copper, chrome, ceramic, teflon, rubber, hard coat polymers, or photopolymers. Seamless print sleeves may be purchased from Stork Screens America Inc. of Charlotte, N.C. As discussed above, the print sleeve 24 includes a main body 25 which is manufactured from a nickel compound and which further includes an exterior surface 30 and an interior surface 31 which defines an inside diameter which is just slightly greater than the outside diameter of air actuated plate cylinder 12 upon which it is employed. Further, the print sleeve includes a first end 32 and an opposite second end 33.

As best illustrated by reference to FIG. 1, the apparatus 10 for supporting an air actuated plate cylinder 12 for facilitating the installation or removal of a print sleeve 24 includes a movable support frame which is generally indicated by the numeral 40. As shown in the drawings, the movable support frame includes first and second portions 41 and 42 respectively which are positioned in predetermined spaced, substantially parallel relation one to the other and which include individual horizontal base members 43. Further, a supporting end panel or plate 44 is made integral with the respective base members by employing suitable fasteners or other techniques such as welding or the like. Each of the plates 44 have opposite interior facing, and exterior facing surfaces 45 and 50, respectively. The first and second portions 41 and 42 are rendered movable by means of releasably lockable casters or wheels 51 which are affixed to the respective base members 43. In this manner the movable support frame is rendered operable for transportation from one printing machine or site to another during printing operations. The releasably lockable casters and wheels are locked or otherwise rendered immovable while the device is being employed thereby preventing the movable support frame from being moved about while an air actuated plate cylinder is being supported thereon. The releasably lockable casters are of conventional design and therefore will not be discussed in further detail herein. The plates 44 each have a peripheral edge 52. Mounted in close proximity to the top peripheral edge 52 of the first portion 41, is a cradle 53 which includes a V-shaped slot 54 which is formed in its uppermost facing surface. Resilient, pads 55 which are manufactured from polymeric based or other natural cushioning materials, are individually mounted on the peripheral edge of the cradle which defines the V-shaped slot and provides a means by which the support shaft 22, which is made integral with the first end 21 of the plate cylinder 12, may be received and supported thereon and thereby protected from friction related damage. It should be understood that the cradle is operable to support the first end 21 of the air actuated plate cylinder 12 in predetermined spaced relationship relative to the gantry of the apparatus 10 while the print sleeve 24 is being installed on, or removed from, the plate cylinder. The gantry of the present invention will be discussed in greater detail hereinafter. A plurality of reinforcement brackets 56 are affixed to each of the base members, and to the respective end plates, in a manner to reinforce same and provide additional strength to the support frame.

A gantry, which is generally indicated by the numeral 60, includes a plurality of elongated support beams or shafts 61, which have substantially circular cross-sectional shapes. The individual support beams are designated as first, second, third and fourth support beams 62, 63, 64, and 65, respectively, hereinafter. The individual support beams are positioned in a predetermined pattern as best illustrated by the reference to FIGS. 1 and 4, and thereby provides a framework upon which a pair of carriages 70 may be individually supported for selective movement along a first, or horizontal path of travel and which is indicated by the line labeled 66. As best seen by reference to FIG. 4, the first and second support beams; and third and fourth support beams, are spaced or otherwise positioned approximately equal distances apart. Further, the first and second beams are positioned in substantially parallel spaced relation one to the other, and with respect to the supporting surface 11, and are otherwise disposed in substantially laterally off-set relation relative to the third and fourth beams. The individual beams are otherwise positioned in substantially normal relation relative to the individual portions 40. The individual carriages 70, which are designated as first and second carriages 71 and 72, respectively, each include a bottom portion or first member 73, and a top portion or second member 74. A pair of end walls 74A join the top and bottom portions together. The individual members 73 and 74 are manufactured from a rigid plate 75 which defines a supporting surface 76. Further, a valve assembly 76A is mounted on one of the end walls 74A. This is best seen by reference to FIG. 4. The operation of this valve assembly will be discussed in greater detail hereinafter. The supporting surface 76 is further defined by a peripheral edge 77. As best illustrated by reference to FIG. 1, a plurality of wheels are mounted on each of the plates 75 and provides a means by which the individual carriages 70 may be movably and selectively positioned in predetermined locations along the gantry 60 and thereby along the first, or horizontal path of travel 66. The individual wheels are of substantially conventional design each having a peripheral edge 81 which has formed therein a U-shaped channel or groove 82 which permits the individual wheels to rollably engage the individual support beams which comprise the gantry 60. As best seen by reference to the drawings, the individual plates 75 are supported for rolling engagement relative to the gantry 60 by four (4) wheels 83 and four (4) wheels 84, respectively. Further, the bottom member 73 includes a fifth, or counterweight wheel 85 which is operable to engage the supporting surface 11 in a manner which substantially inhibits the carriages from bending or otherwise damaging the respective beams when the apparatus is employed to support air actuated plate cylinders 72 which are extremely heavy. Under these circumstances, the counterweight wheel transfers a portion of the weight of the plate cylinder to the supporting surface 11. In addition, a selective locking or breaking means 86 is provided for each of the carriages, and which permits the individual carriages to be substantially restrained in predetermined locations along the gantry 60. As should be understood, the selective locking means inhibits movement of the respective carriages while the individual carriages are being utilized in connection with removing or installing the individual print sleeves 24 as will be discussed in greater detail hereinafter. As should be understood, the selective locking means includes a pair of movable members 86A which are adapted to frictionally engage the first support beam 62 in a fashion which substantially inhibits or restrains movement of the respective carriages along the gantry 60.

Figure 7:
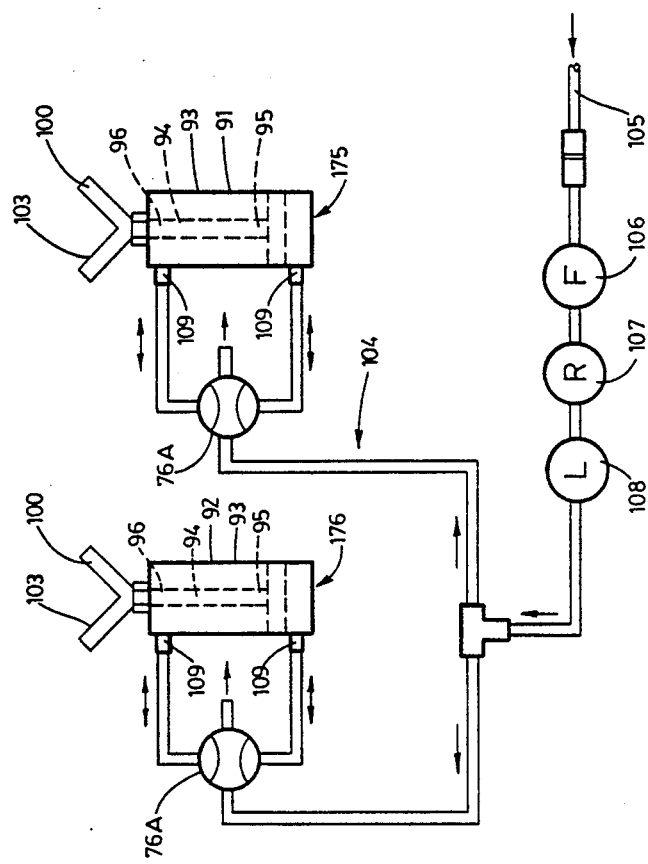
FIG. 7 is a schematic diagram of the pneumatic system employed in connection with the apparatus of the present invention.
Figure 4:
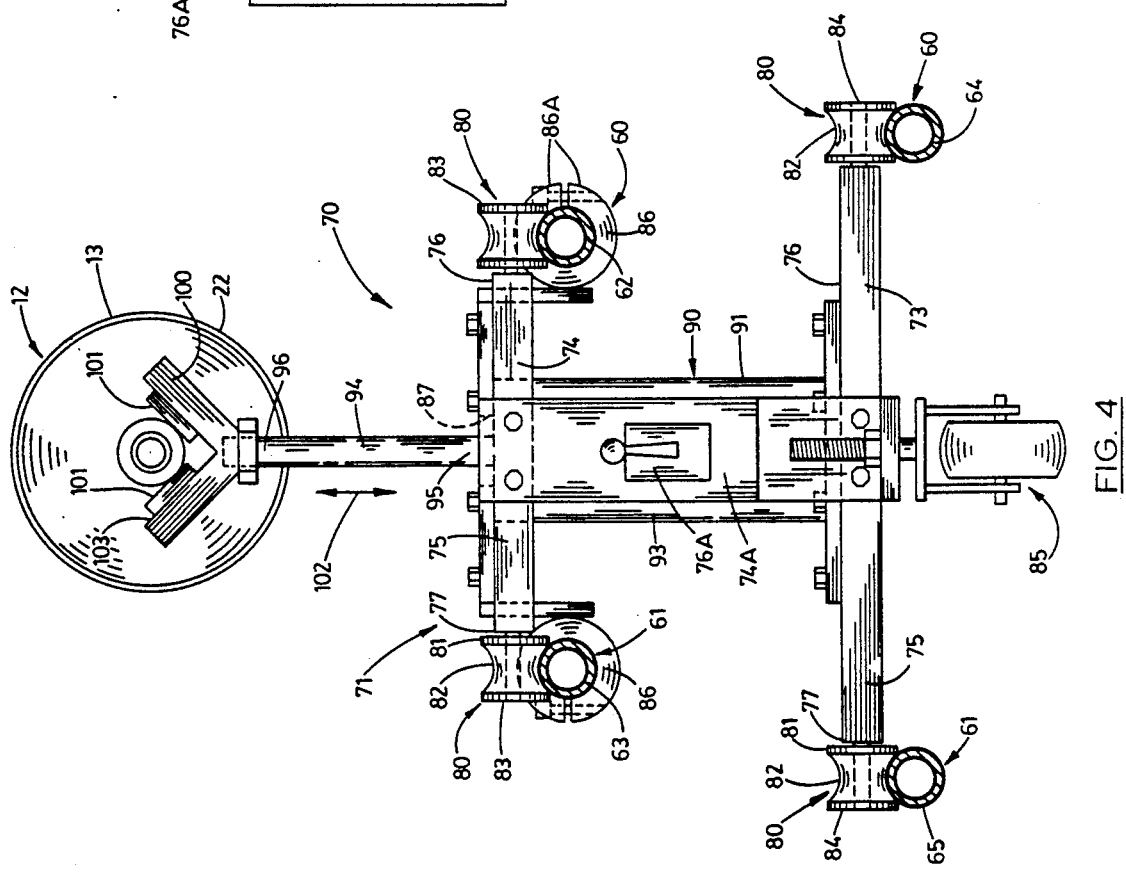
FIG. 4 is a transverse, vertical, sectional view taken from a position along line 4—4 of FIG. 1.
Figure 6:
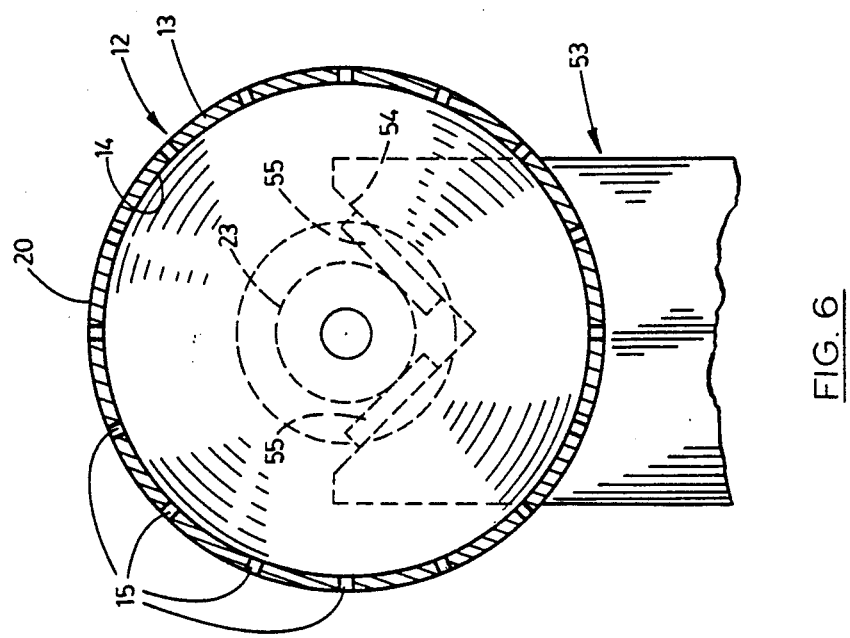
FIG. 6 is a transverse, vertical, sectional view taken from a position along line 6—6 of FIG. 3A.

As best illustrated by reference to FIG. 1 and 4, an aperture 87 is formed substantially centrally relative to the top portion or second member 74 of the individual carriages 70 and provides a means whereby individual air cylinders 90 may be mounted in predetermined positions and in substantially perpendicular attitudes relative to each of the respective carriages. The apparatus 10 includes first and second air cylinders 91 and 92, respectively. The individual air cylinders are of substantially conventional design and include a main body 93 which is fixedly mounted by using a suitable fastening technique to the individual carriages and further includes a movable ram 94 which has a proximal end 95 and a distal end 96. As best seen by reference to the drawings, a cradle 100 is screwthreadably secured on the distal end 96 of each of the respective rams 94. The cradle defines a substantially V-shaped receiving station 103. Individual pads manufactured from pliable or resilient synthetic polymers or other natural cushioning materials 101 are mounted on the cradle 100 and thereby provides protection for the support shaft which is made integral with the second end 22 of the plate cylinder 12. The individual rams 94 are operable for movement along a second path of travel 102 which is disposed in a substantially normal relationship relative to the first path of travel 66 and into positions in supporting relation relative to the second end of the plate cylinder. Each of the air cylinders 90 are individually actuated by means of a pneumatic air system and which is generally indicated by the numeral 104 in FIG. 7. The air system 107 is operable to selectively connect the individual air cylinders in fluid flow communication with a source of pressurized air (not shown). The air system 104 has an intake 105 which is connected in fluid communication with a source of pressurized air. Further the pressurized air is filtered 106 to remove any particulate matter, and is thereafter regulated, as to the pressure, by a regulator 107. The air is additionally lubricated 108 and delivered to the pair of manually actuatable valves 76A. The valves 76A, as earlier discussed, are mounted on the individual carriages as shown in FIGS. 1 and 4 and are manipulated by an operator (not shown) in such a fashion so as to place the individual rams 94 of the air cylinders in predetermined positions along the second path of travel 102. The air system is connected to the pair of ports 109 which are made integral with respective air cylinders.

The apparatus 10 of the subject invention includes a support member which is generally indicated by the numeral 110 and which has a first end 111 and an opposite second end 112. The support member is generally circular in its cross-sectional shape, and further includes an exterior surface 113 and an opposite interior surface 114 which defines a channel 115 of substantially uniform dimensions throughout its entire length. As should be understood, the interior surface 114 defines an inside dimension which is just slightly greater than the outside dimension of the support shaft 23 which is made integral with, and which extends substantially longitudinally outwardly relative to the second end 22 of the air actuated plate cylinder 12. The significance of this feature will be discussed in greater detail in the paragraphs which follow.

Second Form

Figure 2:
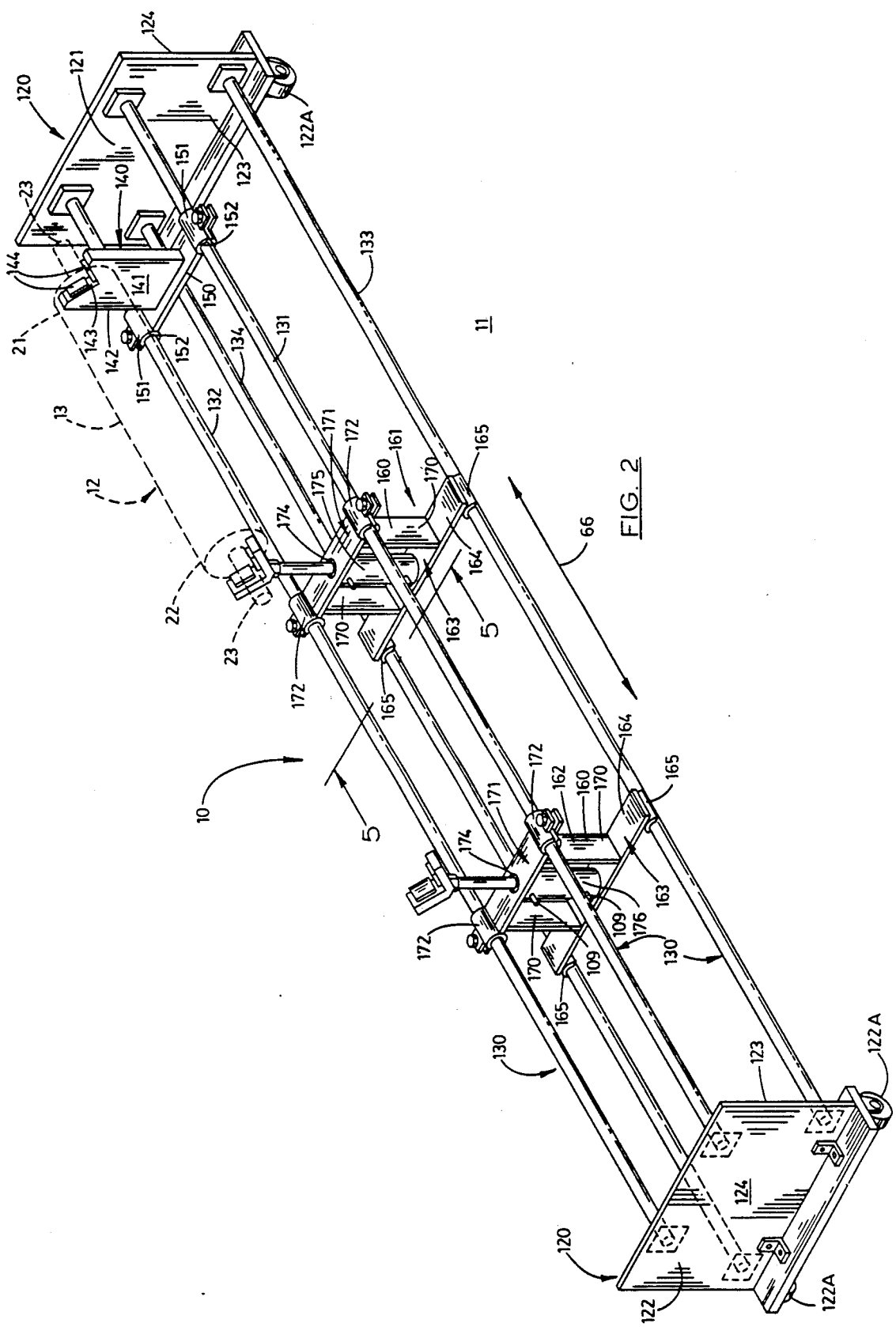
FIG. 2 is a perspective view of the second form of the apparatus of the subject invention shown in a typical operative configuration.
Figure 5:
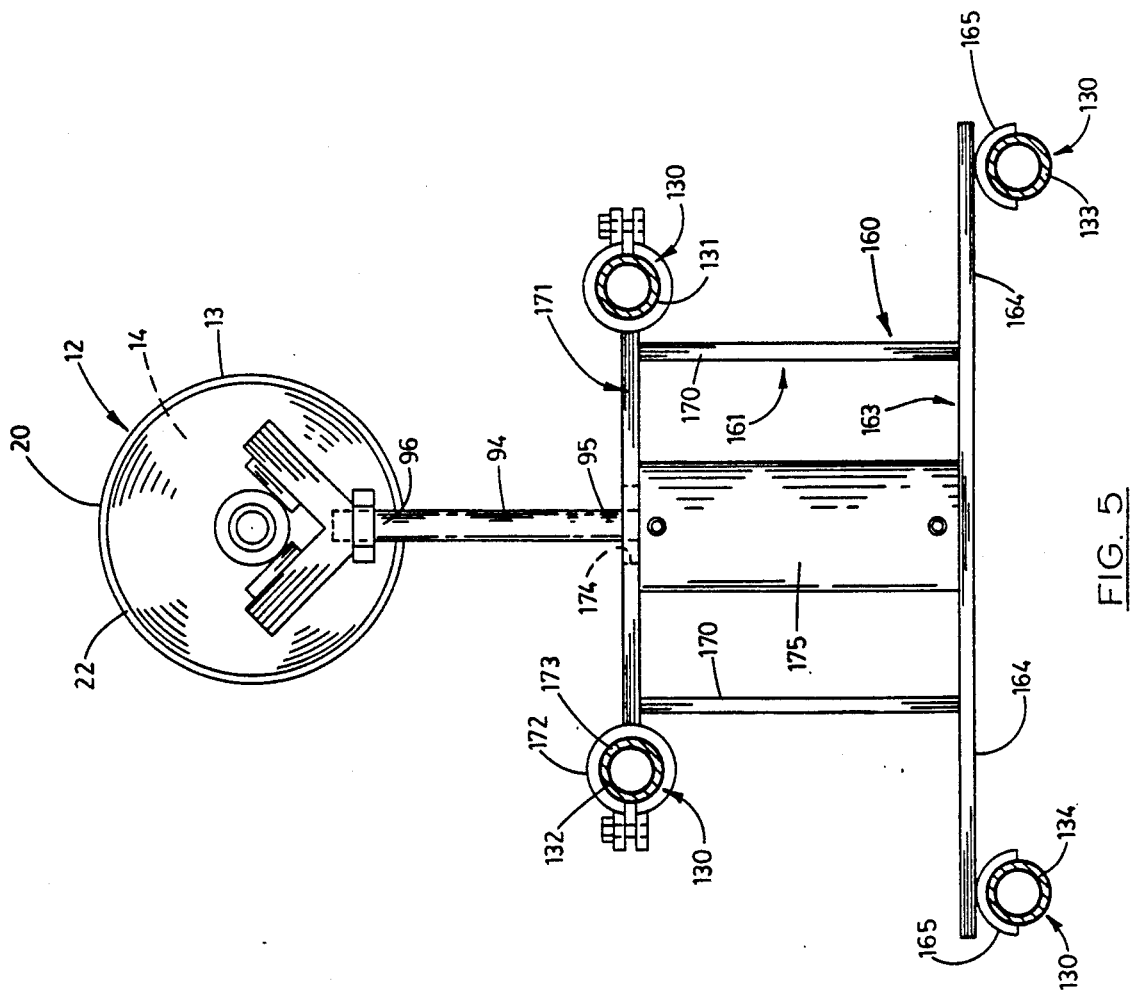
FIG. 5 is a transverse, vertical, sectional view taken from a position along line 5—5 of FIG. 2.

The second form of the apparatus 10 of the present invention, is shown most clearly by reference to FIG. 2, and includes a moveable support frame which is generally indicated by the numeral 120. The support frame includes first and second portions 121 and 122, respectively, and which are positioned in predetermined substantially parallel space relation one with the other. The individual portions are mounted upon releasably lockable casters or wheels 122A. As should be understood, the first and second portions each have inside surfaces 123 upon which a gantry 124 is mounted. The gantry, 124, is substantially similar to the earlier described gantry 60 of the First Form of the invention, and includes a plurality of elongated support beams 130 which are substantially circular in their cross-sectional shapes and which are secured in a predetermined pattern relative to the first and second portions, respectively. The plurality of support beams include first, second, third and fourth beams 131 through 134, respectively. As best illustrated by reference to FIG. 5, the first and second beams are disposed in spaced, laterally offset relation relative to the third and fourth beams 133 and 134 respectively. Further, the respective beams are mounted in substantially perpendicular relation relative to the support frame 120. As shown most clearly by reference to FIG. 2 a cradle, and which is generally indicated by the numeral 140, slidably is mounted on the gantry for movement to predetermined locations along the second path of travel 66. The cradle has a main body 141 which is defined by a peripheral edge 142. Further, the main body has a V-shaped channel 143 which is formed in the uppermost portion of the peripheral edge, and which is operable to receive the support shaft 23 which is made integral with first end 21 of the air actuated plate cylinder 12. In addition to the foregoing, a pair of resilient pads 144 are mounted, using suitable fasteners, in the V-shaped groove and are operable to inhibit friction related damage which could conceivably occur to the support shaft. The main body 141 includes a base portion 150 which has secured thereto a pair of collars which define individual apertures 152. The apertures have a dimension which is greater than the outside diameter of the first and second beams 131 and 132, respectively. This renders the cradle operable for selective movement along the gantry 124 to predetermined locations along the second path of travel 102.

The second form of the invention 10 also includes a pair of carriages which are generally indicated by the numeral 160, and which are designated as first and second carriages 161 and 162, respectively. Each of the carriages has a base portion 163 which includes a pair of arms 164 which extend substantially horizontally, outwardly therefrom. Further, an arcuately or cup shaped member 165 is individually secured to each of the arms. The arcuately shaped members are individually dimensioned to slidably rest in supporting relation on the third and fourth beams 133 and 134, respectively. Secured to the base portion 163, and extending upwardly at a substantially normal attitude therefrom, are a pair of support members 170. Further a top portion or member 171 is secured to the respective support members 170 by employing a suitable fastening technique such as by welding or the like. As best seen by reference to FIG. 5 a pair of collars 172 are fixed in predetermined locations on the top portion 171 by welding or other fastening technique and thereby define individual apertures 173 of predetermined dimensions. The collars are positioned so as to be slidably received in telescoping relation over the first and second support beams. The apertures 173 have a diametral dimension which is just slightly greater than the outside diameter of the first and second support beams 131 and 132 respectively. This arrangement, of course, renders the individual carriages 160 operable for slidable movement along the gantry 124 for the purposes which will be discussed in greater detail hereinafter. As best illustrated by reference to FIG. 2, an aperture 174 is formed substantially centrally of the top portion 171 and accommodates an air cylinder which will hereinafter be designated as first and second air cylinders 175 and 176, and which are made integral with the first and second carriages 161 and 162 respectively. The air cylinders, in all respects, are substantially identical to the first and second air cylinders 91 and 92 respectively which include individual rams 94. Further, the support member 110 which is utilized in connection with the second form of the invention is substantially identical to that which was earlier discussed and therefore for the purposes of brevity is not discussed in further detail herein. Still further, and in a third alternative form of the invention, not shown, a pair of carriages may be slidably mounted on an accompanying support frame and related gantry which is substantially identical to that which was earlier discussed with respect to the first and second forms of the invention, but which includes, instead of individual air cylinders, a hingedly mounted brace member which is operable for movement along a substantially arcuately shaped path of travel into, and out of supporting relation relative to the support shaft 23 which is made integral with the second end 22 of air actuated plate cylinder 12 or the second end 112 of the support member 110 as appropriate.

OPERATION

The operation of the described embodiments of the present invention are believed to be readily apparent and are briefly summarized at this point.

The apparatus 10 of the present invention includes several forms which operate in a substantially identical manner. To utilize the apparatus 10 for supporting an air actuated plate cylinder 12 thereby facilitating the installation or removal of a print sleeve 24, it should be understood that the air actuated plate cylinder 12 would be removed from the printing machine, not shown, and would be transported to the apparatus 10, wherein, upon arriving, the air actuated plate cylinder, and more particularly the support shaft 23 which is made integral with first end 21 would be positioned in rested relation in the V-shaped slot 54 or 143 which is formed in or otherwise defined by the cradle 53 or 140. Upon being positioned in rested receipt in the cradle 53 or 140, the first carriage 71 or 161 would be moved into a position substantially in alignment with, and below, the support shaft 23 which is made integral with the second end 22 of the air actuated plate cylinder 12. This relationship is shown most clearly by reference to FIG. 1. After being locked in this position by utilizing the locking means 86, an operator would actuate the first air cylinder 91 or 175 by supplying air under pressure (not shown) thereby causing the ram 94 to move along the second path of travel 102 and into an extended, supporting position as shown in FIG. 3A. In this position the distal end 96, and more particularly the "V" shaped receiving station 103 of the cradle 100 which is mounted thereon is moved into supporting relationship relative to the second end 22 of the plate cylinder 12.

The next step in the process of installing or removing the print sleeve 24 includes positioning the support member 110 in substantially coaxial telescoping alignment relative to support shaft 23 which is made integral with the second end 22 of the air actuated plate cylinder 30 and moving it into engagement therewith. In this position, the support shaft is operable to be received in telescoping receipt in the channel 115. This relationship is shown most clearly by reference to FIG. 3B. When this step is achieved, the second carriage 72 or 162 is moved into a predetermined position along the gantry 60 or 124 wherein it is in substantial alignment with the second end 112 of the support member. When positioned appropriately it is locked into position. Following this step, the operator would supply pressurized air to the second air cylinder 92 or 176 thereby causing the respective ram 94 to move along the second path of travel 102 and into supporting relation relative to the second end 112 of the support member 110. Upon moving to this position, the operator would deactivate the first air cylinder 91 by manually manipulating the valve 76A as appropriate which is made integral with the first carriage thereby causing the ram 94 to retract from its supporting relationship relative to the second end of the plate cylinder 12. As should be understood the plate cylinder would remain in a suspended position in spaced, substantially parallel relationship relative to the gantry 60 or 124. This is shown most clearly by reference to FIG. 3C.

To remove a print sleeve 24 which is mounted on the air actuated plate cylinder 12 the operator (not shown) would thereafter connect the air actuated plate cylinder 12 in fluid flow communication relative to the source of pressurized air (not shown). The pressurized air supplied to the cavity 14 through the conduit 14A would in turn, escape through the air apertures 15 which are formed in the main body 13, and would thus cause the expansion of the print sleeve 24 thereby facilitating its removal from the main body 13 of the plate cylinder 12. The print sleeve would then be slidably urged off of the main body of the plate cylinder and would be received in telescoping relation on and about the support member 110. After accomplishing the foregoing, the ram 94 of the first carriage 71 or 161 would be extended into supporting relationship relative to the support shaft which is made integral with the second end 22 of the plate cylinder 12 and this would thereby permit the support member 110 to be removed therefrom. The plate cylinder 12 could be removed from the apparatus 10 thereafter, and placed in a stored location remote to the apparatus 10 or could alternatively be reinstalled in the printing machine as operational conditions warrant.

To install a print sleeve, a substantially identical procedure would be employed, that is, the plate cylinder 12 which would be utilized, would be placed on the apparatus 10 with the support shaft 23 which is made integral with the first end thereof rested in supporting relation on the cradle 53 or 140. The first carriage 71 or 161 would then be positioned in substantial alignment with, and underneath, the support shaft which is made integral with the second end 22 of the plate cylinder. The operator would thereafter supply pressurized air to the first air cylinder 91 or 175 thereby causing the ram 94 to extend into supporting relationship relative to the second end of the plate cylinder. Further, the second carriage 72 or 162 would be moved to a position in spaced relationship relative to the first carriage, and in substantial alignment with the second end 112 of the support member 110, and the support member 100 would be positioned or otherwise moved into engagement with the support shaft 23 which is made integral with the second end 22 of the plate cylinder 12, as earlier discussed. Following this step, the ram of the second air cylinder 92 or 176 would be extended into supporting relationship relative to the second end 112 of the support member 110 and the ram of the first air cylinder would be withdrawn from supporting relation relative to the second end of the plate cylinder. As should be understood, and prior to positioning the support member 110 in engagement with the support shaft which is made integral with the second end of the plate cylinder, the print sleeve 24, which is to be installed, would be telescopingly received or positioned in supporting relationship on and about the support member 110 as shown in FIG. 3B. Following withdrawal of the ram of the first air cylinder, the print sleeve 24 would be slidably moved into engagement with the main body 13 of the air actuated plate cylinder 12. Upon engagement with the main body, and following pressurization of the air actuated plate cylinder, the air escaping through the air apertures would expand the print sleeve thereby permitting the sleeve to be slidably urged onto the main body on a cushion of air as earlier discussed. Following installation, the ram 94 of the first carriage 71 or 161 would be moved into supporting relationship relative to the second end of the plate cylinder, and the support member 110 would be removed therefrom. This is shown in FIG. 3D. The plate cylinder is then in a condition to be removed from the apparatus 10 and installed in a printing machine for further use.

Therefore, the apparatus 10 for supporting an air actuated plate cylinder 12 to facilitate the installation or removal of a print sleeve 24 is particularly well suited for use in the printing industry; dependably and safely supports a print cylinder in predetermined spaced relationship relative to a gantry 60 or 124 to facilitate the installation or removal of a print sleeve; and further provides a convenient means whereby such print sleeves may be installed or removed in an expeditious and cost efficient fashion not possible heretofore.

Although the invention has been herein shown and described in what is conceived to be the most practical and preferred embodiment, it is recognized that departures may be made therefrom within the scope of the invention which is not to be limited to the illustrated details disclosed.

Having described my invention what I claim is new and desire to secure by letters patent is:

1. A method for installing a print sleeve on an air actuated plate cylinder which has opposite first and second ends comprising:
    supporting the first and second ends of the plate cylinder;
    engaging the second end of the plate cylinder with a support member which has opposite first and second ends, and wherein the first end of the support member engages the plate cylinder, and wherein the support member extends substantially longitudinally outwardly thereto;
    positioning a print sleeve in telescoping receipt on the support member;
    supporting the second end of the support member;
    releasing the support provided for the second end of the plate cylinder;
    pressurizing the plate cylinder;
    sliding the print sleeve onto the plate cylinder;
    depressurizing the plate cylinder;
    supporting the second end of the plate cylinder; and
    removing the support member.

2. An apparatus for supporting a work object in a predetermined position to facilitate work being performed thereon, the work object having first and second ends comprising:
    a frame for supporting the work object, and wherein the frame includes first and second portions, and wherein the first portion includes a cradle for supporting the first end of the work object, and wherein a gantry is mounted on and positioned between the first and second portions, the gantry including at least one support beam which defines a first path of travel;
    first and second carriages which are individually operable for movement along the first path of travel, and wherein each of the carriages includes means for releasably locking the individual carriages in predetermined positions along the gantry;
    a first support means for releasably supporting the second end of the work object and which is mounted on the first carriage for movement along the first path of travel, and wherein the first support means is operable for movement along a second path of travel;
    a support member for engaging the second end of the work object; and
    a second support means for engaging the support member, and wherein the second support means is mounted on the second carriage for movement along the first path of travel, and is further operable for movement along the second path of travel, and wherein the first support means is disengaged from the work object thereby permitting the work to be performed on the work object.

3. An apparatus as claimed in claim 2 and wherein the first and second support means include individual air cylinders having rams, and wherein the rams are moveable along the second path of travel and into supporting relation relative to the second end of the work object.

4. An apparatus as claimed in claim 3 and wherein the work object is an air actuated plate cylinder and the work being performed is an installation or removal of a print sleeve, and wherein the support member has opposite first and second ends and wherein the first end is adapted to engage the second end of the plate cylinder, and wherein upon installation or removal of the print sleeve the ram made integral with the first carriage is extended into supporting relation relative to the second end of the plate cylinder and the first end of the support member engages the second end of the plate cylinder, and wherein the ram made integral with the second carriage is extended into engagement with the second end of the support member, and the ram made integral with the first carriage is moved out of engagement with the second end of the plate cylinder thereby facilitating installation or removal of the print sleeve.

5. An apparatus as claimed in claim 4 and wherein upon installation or removal of the print sleeve a source of pressurized air is supplied to the plate cylinder thereby facilitating installation or removal of the print sleeve, and wherein upon removal of the print sleeve, the print sleeve is moved from a position in fitted relation about the plate cylinder to a position in telescoping relation about the support member, and wherein upon installation of the print sleeve, the print sleeve is moved from a position in telescoping relation above the support member to a position in fitted relation about the plate cylinder.

6. An apparatus as claimed in claim 2 and wherein the first and second support means include individual braces which are hingedly mounted for movement along the second path of travel.

7. An apparatus for supporting an air actuated plate cylinder to facilitate the installation or removal of a print sleeve, the plate cylinder having opposite first and second ends comprising:
    a support frame for supporting the first end of the plate cylinder;
    a gantry mounted on the support frame;
    a first carriage mounted for movement along the gantry;
    a second carriage mounted for movement along the gantry;
    means mounted on the first and second carriages for supporting the second end of the plate cylinder in spaced relation relative to the gantry, the support means including a portion which is selectively moveable into supporting relation relative to the second end of the plate cylinder and;
    a support member having opposite first and second ends, the first end operable to engage the second end of the plate cylinder, and the second end engaged by the portion which is made integral with the second carriage, and wherein upon installation, the print sleeve is telescopingly received over the support member, and wherein the brace made integral with the first carriage is selectively moved out of engagement with the second end of the plate cylinder thereby permitting installation of the print sleeve on the plate cylinder, and wherein upon removal, the print sleeve is moved from an operable position in fitted relation about the plate cylinder to an inoperable position in telescoping receipt about the support member, and wherein following installation or removal of the print sleeve the portion which is made integral with the first carriage is moved into supporting engagement relative to the second end of the plate cylinder and the portion made integral with the second carriage is moved out of supporting engagement relative to the second end of the support member thereby permitting removal of the support member.

8. An apparatus as claimed in claim 7 and wherein the support frame includes first and second frame members, and wherein the first frame member includes a cradle for supporting the first end of the plate cylinder, and wherein the apparatus further includes means for releasably securing the individual carriages in predetermined positions along the gantry.

9. An apparatus as claimed in claim 8 and wherein the gantry includes a plurality of support beams which define a first path of travel for the first and second carriages, wherein the respective carriages further include a plurality of wheels which are individually operable to rotatably engage the respective support beams and thereby support the respective carriages for movement along the gantry.

10. An apparatus as claimed in claim 9, and wherein the supporting means includes a pair of air cylinders having respective rams and which are individually mounted on the respective first and second carriages, and wherein the portions include the rams which are made integral with the individual air cylinders, and wherein the respective rams are operable for movement along a second path of travel which is disposed in a substantially normal attitude relative to the first path of travel.

11. An apparatus as claimed in claim 10 and wherein the support frame is operable for movement along a supporting surface, and wherein the individual carriages include a counter-weight wheel for engaging the supporting surface thereby facilitating movement of the individual carriages along the gantry.

12. An apparatus for supporting an air actuated plate cylinder to facilitate the installation or removal of a print sleeve, the plate cylinder having opposite first and second ends comprising:
 a moveable support frame for supporting the first end of the print cylinder and including first and second portions, and wherein the first portion includes a cradle which supports the first end of the print cylinder;
 a gantry borne by the first and second portions;
 first and second carriages mounted for movement along the gantry, each carriage including a portion which is moveable into and out of supporting engagement relative to the plate cylinder;
 a support member having opposite first and second ends, and wherein the first end of the support member releasably engages the second end of the plate cylinder, and wherein the second end of the support member is supported by the portion which is made integral with the second carriage;
 means for releasably locking the respective carriages in predetermined locations along the gantry; and
 means for selectively moving the respective portions into supporting relation relative to the plate cylinder, and wherein upon installation or removal of the print sleeve the portion made integral with the first carriage is extended into supporting relation relative to the second end of the plate cylinder and the support member is positioned in engagement with the plate cylinder, and wherein upon installation of the print sleeve, the print sleeve is telescopingly received on the support member, and wherein the portion made integral with the second carriage is positioned in supporting relation relative to the second end of the support member and the portion made integral with the first carriage is removed from supporting relation relative to the second end of the plate cylinder thereby facilitating the installation of the print sleeve by permitting the movement of the print sleeve from the support member onto the plate cylinder, and wherein upon removal of the print sleeve, the portion made integral with the first carriage is positioned in supporting relation relative to the second end of the plate cylinder, and wherein the portion made integral with the second carriage is positioned in supporting relation relative to the second end of the support member, and wherein the portion made integral with the first carriage is removed from supporting relation relative to the second end of the plate cylinder thereby permitting removal of the print sleeve from the plate cylinder to a position in telescoping receipt on and about the support member, and wherein following installation or removal of the print sleeve the portion made integral with the first carriage is moved into supporting relation relative to the second end of the plate cylinder and the portion made integral with the second carriage is withdrawn from supporting relation relative to the support member thereby permitting removal of the support member.

13. An apparatus as claimed in claim 12 and wherein the first and second portions of the support frame are disposed in spaced relation one to the other, and wherein the gantry includes a support beam having opposite ends which are individually affixed to the respective first and second portions and which defines a substantially horizontally disposed first path of travel for the individual carriages, and wherein the second path of travel is substantially perpendicular to the first path of travel, and wherein the portions made integral with the carriages include rams which are integral with individual air cylinders which are mounted on each of the carriages.

14. An apparatus as claimed in claim 13 and wherein the moving means includes a source of pressurized which is selectively supplied to the respective air cylinders thereby causing the individual rams to move along the second path of travel.

15. An apparatus as claimed in claim 13 and wherein the individual portions made integral with the respective carriages include hingedly mounted braces which are individually mounted on the respective carriages and which are operable for movement along the second path of travel.

16. An apparatus for supporting a work object which has opposite first and second ends comprising:
 a frame including a first portion which supports the first end of the work object, and a second portion remote thereto,
 a gantry disposed between the first and second portions and defining a first path of travel;
 first and second carriages mounted on the gantry and operable for movement along the first path of travel;
 first support means mounted on the first carriage and operable for movement along a second path of travel and into supporting relation relative to the second end of the work object;

a support member operable to engage the second end of the work object; and a second support means mounted on the second carriage and operable for movement along the second path of travel and into supporting relation relative to the support member and wherein the first support means is disengaged from the work object thereby permitting the work to be performed on the work object.

* * * * *